(12) United States Patent
Tanaka

(10) Patent No.: US 11,581,106 B1
(45) Date of Patent: Feb. 14, 2023

(54) CONDUCTIVE SUBSTRATE AND TOUCH PANEL

(71) Applicant: FUJIFILM Corporation, Tokyo (JP)

(72) Inventor: Satoshi Tanaka, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 17/861,968

(22) Filed: Jul. 11, 2022

(30) Foreign Application Priority Data

Aug. 31, 2021 (JP) .............................. JP2021-140623
Feb. 3, 2022 (JP) .............................. JP2022-015662

(51) Int. Cl.
*H01B 1/12* (2006.01)
*G06F 3/044* (2006.01)
*H01B 1/02* (2006.01)
*B32B 15/04* (2006.01)

(52) U.S. Cl.
CPC .............. *H01B 1/12* (2013.01); *B32B 15/04* (2013.01); *G06F 3/044* (2013.01); *H01B 1/02* (2013.01); *B32B 2307/202* (2013.01); *G06F 2203/04112* (2013.01)

(58) Field of Classification Search
None
See application file for complete search history.

(56) References Cited

U.S. PATENT DOCUMENTS

2019/0235672 A1* 8/2019 Ichiki .................... G06F 3/0446
2021/0403769 A1* 12/2021 Kiyoto ....................... C09J 5/00

FOREIGN PATENT DOCUMENTS

JP          2015-133239 A      7/2015

\* cited by examiner

*Primary Examiner* — Stephen T. Reed
(74) *Attorney, Agent, or Firm* — Edwards Neils LLC; Jean C. Edwards, Esq.

(57) ABSTRACT

A conductive substrate includes a base material and a conductive layer arranged on the base material, in which the conductive layer has a conductive thin wire part containing a metal and a transparent insulating part containing no metal, the transparent insulating part being adjacent to the conductive thin wire part, and the conductive layer contains a compound represented by Formula (1).

7 Claims, 1 Drawing Sheet

CONDUCTIVE SUBSTRATE AND TOUCH PANEL

CROSS-REFERENCE TO RELATED APPLICATIONS

The present application claims priority under 35 U.S.C. § 119 to Japanese Patent Application No. 2021-140623 filed on Aug. 31, 2021, and Japanese Patent Application No. 2022-015662 filed on Feb. 3, 2022. The above applications are hereby expressly incorporated by reference, in their entirety, into the present application.

BACKGROUND OF THE INVENTION

1. Field of the Invention

The present invention relates to a conductive substrate and a touch panel.

2. Description of the Related Art

A conductive substrate having a conductive thin wire (a thin wire-shaped wire that exhibits conductivity) is widely used in various use applications in, for example, a touch panel, a solar cell, and an electro luminescence (EL) element. In particular, in recent years, the mounting rate of touch panels on mobile phones and mobile game devices has been increasing, and the demand for the conductive substrate for a capacitance type touch panel that makes multi-point detection possible is rapidly expanding.

For example, JP2015-133239A discloses a technique relating to a manufacturing method for an electrode pattern sheet that has an image unit having a conduction pattern consisting of a metal and having a peripheral wiring part connected to the conduction pattern, and a plurality of repeating units consisting of a non-conductive part that makes an adjacent image unit unconnectable, and it describes, as a method of forming a conduction pattern and a peripheral wiring part, a printing method, a photolithography method, a method using a silver salt photographic photosensitive material as a conductive material precursor, and the like.

SUMMARY OF THE INVENTION

In such touch panels, a conductive substrate and various members are mounted around the periphery of the conductive substrate. A sulfur-containing compound may be mixed in a cushioning material, an adhesive, or the like, which is used in the peripheral members. In addition, a sulfur component such as $H_2S$ or $SO_2$ is also present in the use environment of the touch panel.

As a result of examining a conductive substrate having a conductive thin wire with reference to JP2015-133239A, the inventors of the present invention found that there is a problem that this sulfur source present around the periphery of the conductive substrate causes a sulfurization reaction of a metal thin wire constituting the wire, thereby reducing the conductivity of the wire, which causes the decrease in the sensitivity of the touch panel and the failure such as a malfunction.

In consideration of the above circumstances, an object of the present invention is to provide a conductive substrate having excellent sulfurization resistance of the conductive thin wire part.

As a result of carrying out intensive studies to achieve the above-described object, the inventors of the present invention have found that the above-described object can be achieved by the following constitutions.

[1] A conductive substrate comprising:
 a base material; and
 a conductive layer arranged on the base material,
 in which the conductive layer has a conductive thin wire part containing a metal and a transparent insulating part containing no metal, the transparent insulating part being adjacent to the conductive thin wire part, and the conductive layer contains a compound represented by Formula (1) described later.

[2] The conductive substrate according to [1], in which R represents a hydrogen atom, an alkyl group having 1 to 3 carbon atoms, or an alkoxy group having 1 to 3 carbon atoms.

[3] The conductive substrate according to [1] or [2], in which the compound includes at least one selected from the group consisting of 2-mercaptobenzimidazole, 5-methyl-2-mercaptobenzimidazole, and 5-methoxy-2-mercaptobenzimidazole.

[4] The conductive substrate according to any one of [1] to [3], in which a content of the compound per area of the conductive layer is 0.1 to 10 μg/cm².

[5] The conductive substrate according to any one of [1] to [4], in which the metal includes silver.

[6] The conductive substrate according to any one of [1] to [5], in which the conductive substrate has a mesh pattern formed from the conductive thin wire.

[7] A touch panel comprising the conductive substrate according to any one of [1] to [6].

According to the present invention, it is possible to provide a conductive substrate having excellent sulfurization resistance of the conductive thin wire part.

DESCRIPTION OF THE PREFERRED EMBODIMENTS

Hereinafter, a conductive substrate according to the embodiment of the present invention will be described in detail with reference to the drawings.

The following constitution requirements will be described based on the representative embodiment of the present invention; however, the present invention is not limited to such an embodiment. Further, the figures shown below are exemplary for describing the present invention, and thus the present invention is not limited by the figures shown below.

In the present specification, a numerical range represented by "to" means a range including numerical values before and after "to" as a lower limit value and an upper limit value.

In the present specification, in a case where two or more kinds of a certain component are present, the "content" of the component means the total content of the two or more kinds of the component.

In the present specification, "g" and "mg" represent "mass g" and "mass mg", respectively.

In the present specification, the "polymer" or the "polymeric compound" means a compound having a weight-average molecular weight of 2,000 or more. Here, the weight-average molecular weight is defined as a polystyrene-equivalent value according to the gel permeation chromatography (GPC) measurement.

In the present specification, the notations related to angles described as, for example, an angle represented by a specific numerical value, "parallel", "vertical", and "orthogonal" include error ranges generally tolerated in the art, unless otherwise described.

The "organic group" in the present specification means a group containing at least one carbon atom.

Conductive Substrate

A conductive substrate according to the embodiment of the present invention has a base material and a conductive layer arranged on the base material. The conductive layer has a conductive thin wire part and a transparent insulating part adjacent to the conductive thin wire part. The conductive thin wire part contains a metal, but the transparent insulating part does not contain a metal. In addition, the conductive layer further contains a compound represented by Formula (1) described later.

Figure 1:
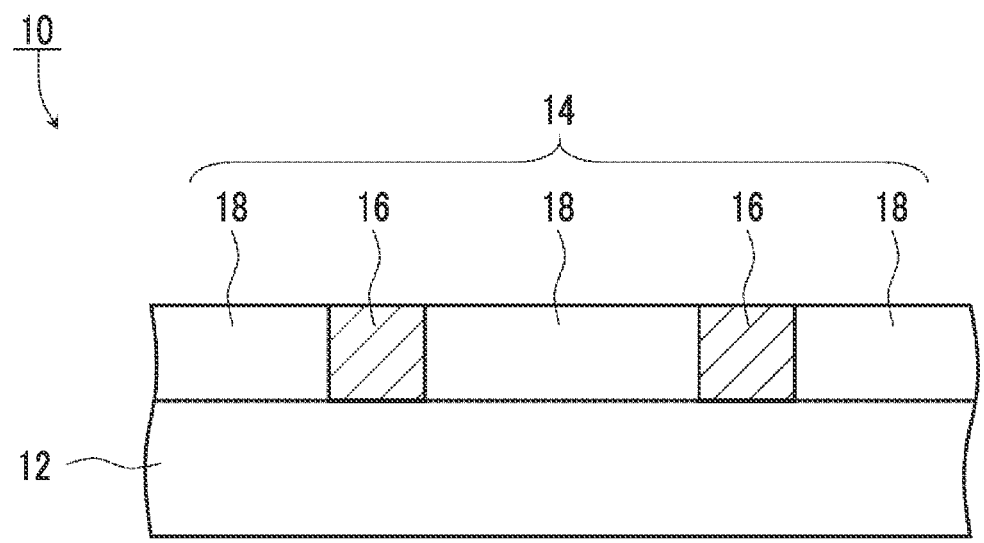
FIG. 1 is a schematic cross-sectional view illustrating an example of a constitution of a conductive substrate according to the present invention.

FIG. 1 is a schematic cross-sectional view illustrating an example of a constitution of a conductive substrate according to the embodiment of the present invention.

The conductive substrate 10 illustrated in FIG. 1 has a base material 12 and a conductive layer 14 arranged on the surface of the base material 12. The conductive layer 14 is composed of a conductive thin wire part 16 and a transparent insulating part 18 adjacent to the conductive thin wire part 16. Although two conductive thin wire parts 16 that extend in a direction perpendicular to the paper surface are illustrated in FIG. 1, it is noted that the arrangement form of the conductive thin wire parts 16 and the number thereof are not particularly limited.

Base Material

The kind of base material is not particularly limited as long as the base material is a member capable of supporting a photosensitive layer and a conductive thin wire part. Examples thereof include a plastic substrate, a glass substrate, and a metal substrate, and a plastic substrate is preferable.

The base material is preferably a base material having flexibility from the viewpoint that the conductive member to be obtained has excellent bendability. Examples of the base material having flexibility include the above-described plastic substrate.

The thickness of the base material is not particularly limited, and it is 25 to 500 μm in a large number of cases. In a case where the conductive substrate is applied to a touch panel, the thickness of the base material may exceed 500 μm in a case where the surface of the base material is used as a touch surface.

The material that constitutes the base material is preferably a resin having a melting point of about 290° C. or lower, such as polyethylene terephthalate (PET) (258° C.), polycycloolefin (134° C.), polycarbonate (250° C.), an acrylic film (128° C.), polyethylene naphthalate (269° C.), polyethylene (135° C.), polypropylene (163° C.), polystyrene (230° C.), polyvinyl chloride (180° C.), polyvinylidene chloride (212° C.), or triacetyl cellulose (290° C.), and more preferably PET, polycycloolefin, or polycarbonate. Among the above, PET is particularly preferable since it has excellent adhesiveness to the conductive thin wire part. The numerical value in the brackets is the melting point or the glass transition temperature.

The total light transmittance of the base material is preferably 85% to 100%. The total light transmittance is measured using "Plastics—Determination of total light transmittance and total light reflectivity" specified in Japanese Industrial Standards (JIS) K 7375: 2008.

An undercoat layer may be arranged on the surface of the base material.

The undercoat layer preferably contains a specific polymer described later. In a case where this undercoat layer is used, the adhesiveness of the conductive layer described later to the base material is further improved.

A method of forming the undercoat layer is not particularly limited, and examples thereof include a method of applying a composition for forming an undercoat layer, containing a specific polymer described later, onto a base material and carrying out a heating treatment as necessary. The composition for forming an undercoat layer may contain a solvent, as necessary. The kind of solvent is not particularly limited, and examples thereof include a solvent that is used in a composition for forming a photosensitive layer described later. Further, as the composition for forming an undercoat layer containing the specific polymer, latex that contains particles of the specific polymer may be used.

The thickness of the undercoat layer is not particularly limited, and it is preferably 0.02 to 0.3 μm and more preferably 0.03 to 0.2 μm from the viewpoint that the adhesiveness of the conductive layer to the base material is more excellent.

Conductive Layer

The conductive layer has a conductive thin wire part and a transparent insulating part. That is, on the surface of the base material of the conductive substrate, a conductive thin wire part containing a metal and a transparent insulating part containing no metal are arranged as a conductive layer.

The arrangement of the conductive thin wire part and the transparent insulating part in the conductive layer is not particularly limited.

The conductive layer may have a pattern formed from the conductive thin wire part and the transparent insulating part. The pattern thereof is not particularly limited, and it is preferably, for example, a triangle such as a regular triangle, an isosceles triangle, or a right triangle, a quadrangle such as a square, a rectangle, a rhombus, a parallelogram, or a trapezoid, a (regular) n-polygon such as a (regular) hexagon or a (regular) octagon, a circle, an ellipse, a star shape, and a geometric shape that is obtained by combining these geometric shape, and more preferably a mesh shape (a mesh pattern).

Figure 2:
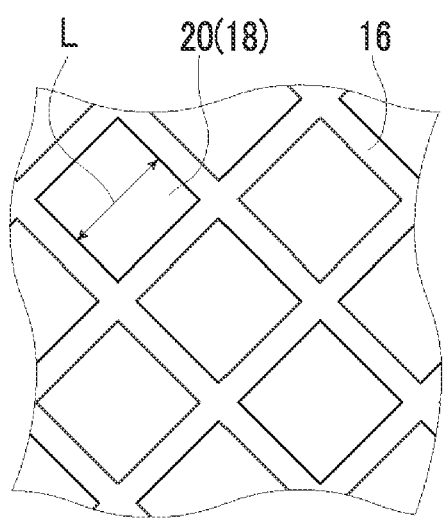
FIG. 2 is a plan view illustrating an example of a mesh pattern included in the conductive layer of the conductive substrate according to the present invention.

FIG. 2 is a plan view illustrating an example of a mesh pattern of the conductive layer.

As illustrated in FIG. 2, the mesh shape is intended to be a shape including a plurality of non-thin wire parts (lattices) 20 which are composed of the transparent insulating part 18 and spaced apart from each other by the intersecting conductive thin wire parts 16. In FIG. 2, the non-thin wire part 20 has a square shape in which the length of one side is L; however, the non-thin wire part of the mesh pattern may have another shape, and the shape may be, for example, a polygonal shape (for example, a triangle, a quadrangle (a rhombus shape, a rectangle shape, or the like), a hexagon, or a random polygonal shape). Further, the shape of the side may be a curved shape other than a straight line or may be a circular arc shape. In the case of the circular arc shape, for example, two sides facing each other may have a circular arc shape protruding outward, and the other two sides facing each other may have a circular arc shape protruding inward. Further, the shape of each of the sides may be a wavy line shape in which a circular arc protruding outward and a circular arc protruding inward are continuous. Needless to say, the shape of each of the sides may be a sine curve.

The length L of one side of the non-thin wire part 20 is not particularly limited, and it is preferably 1,500 μm or less, more preferably 1,300 μm or less, and still more preferably 1,000 μm or less. The lower limit value of the length L is not particularly limited; however, it is preferably 5 μm or more, more preferably 30 μm or more, and still more preferably 80 μm or more. In a case where the length of one side of the non-thin wire part is in the above range, it is possible to further maintain good transparency, and in a case where the conductive substrate is attached to the front surface of a display device, it is possible to visually recognize the display without an uncomfortable feeling.

From the viewpoint of visible light transmittance, an opening ratio of the mesh pattern that is formed from the conductive thin wire part is preferably 90% or more, more preferably 95% or more, and still more preferably 99% or more. The upper limit thereof is not particularly limited; however, it may be less than 100%.

The opening ratio means a ratio (an area ratio) of the region occupied by the transparent insulating part with respect to the entire region occupied by the mesh pattern in the region where the mesh pattern of the conductive substrate is formed.

The thickness of the conductive layer is not particularly limited: however, it is preferably 0.5 to 3.0 μm and more preferably 1.0 to 2.0 μm.

The thickness of the above-described conductive layer is determined by randomly selecting five places corresponding to the thickness of one conductive thin wire part by using a scanning electron microscope and calculating an arithmetic average value of the portions corresponding to the thicknesses of the five places.

Conductive Thin Wire Part

The conductive thin wire part is a portion that guarantees the conductive characteristics of the conductive substrate by containing a metal.

From the viewpoint that conductive characteristics are more excellent, the metal is preferably a mixture with one or more metals selected from the group consisting of silver (metallic silver), copper (metallic copper), gold (metallic gold), nickel (metallic nickel), and palladium (metallic palladium), more preferably elemental silver or a mixture of silver and copper, and still more preferably elemental silver.

In the present specification, the conductive thin wire part is intended to be a thin wire-shaped region that is arranged on the surface of the base material and integrally formed of a material containing a metal. For example, a silver halide-free layer that is formed according to a step H described later and a protective layer formed according to a step I described later constitutes a conductive thin wire part together with a thin wire-shaped metal-containing layer (a silver-containing layer) formed according to a step A and a step B described later.

Further, the conductive thin wire part may be or may not be electrically connected to a member in the outside of the conductive substrate. Apart of the conductive thin wire part may be a dummy electrode electrically isolated from the outside.

The metal contained in the conductive thin wire part generally has a solid particle shape. The average particle diameter of the metal is preferably 10 to 1,000 nm and more preferably 10 to 200 nm in terms of sphere equivalent diameter. Here, the sphere equivalent diameter is the diameter of spherical particles having the same volume, and the average particle diameter of the metal particles is obtained as an average value obtained by measuring the sphere equivalent diameters of one hundred objects and arithmetically averaging them.

The shape of the metal particle is not particularly limited, and examples thereof include a spherical shape, a cubic shape, a flat plate shape, an octahedron shape, and a tetradecahedron shape. Further, the metal particles may be bonded partially or wholly by fusion welding.

The conductive thin wire part may have a structure which is formed by a plurality of metals being dispersed in a polymeric compound described later, or metal particles may be aggregated in the polymeric compound to be present as an aggregate. Further, at least parts of the plurality of metals contained in the conductive thin wire part may be joined to each other by a metal derived from a metal ion that is used in a plating treatment described later.

The metal content in the conductive thin wire part is not particularly limited, and it is preferably 3.0 to 20.0 g/m² and more preferably 5.0 to 15.0 g/m² from the viewpoint that the conductivity of the conductive substrate is more excellent.

The conductive thin wire part may contain a polymeric compound in addition to the metal.

The kind of the polymeric compound contained in the conductive thin wire part is not particularly limited, and a known polymeric compound can be used. Among the above, it is preferably a polymeric compound different from gelatin (hereinafter, also referred to as "specific polymer") from the viewpoint that it is possible to form a silver-containing layer and a conductive thin wire part, having higher hardness.

The kind of specific polymer is not particularly limited as long as it is different from gelatin, and the specific polymer is preferably a polymer that is not decomposed by a proteolytic enzyme or an oxidizing agent described later, which decomposes gelatin.

Examples of the specific polymer include a hydrophobic polymer (a water-insoluble polymer), which includes, for example, at least any one resin selected from the group consisting of a (meth)acrylic resin, a styrene-based resin, s vinyl-based resin, a polyolefin-based resin, a polyester-based resin, a polyurethane-based resin, a polyamide-based resin, a polycarbonate-based resin, a polydiene-based resin, an epoxy-based resin, a silicone-based resin, a cellulose-based polymer, and a chitosan-based polymer, or a copolymer consisting of monomers that constitute these resins.

Further, the specific polymer preferably has a reactive group that reacts with a crosslinking agent described later.

The specific polymer preferably has a particle shape. That is, it is preferable that the conductive thin wire part contains particles of the specific polymer.

The specific polymer is preferably a polymer (a copolymer) represented by General Formula (1) below.

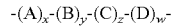  General Formula (1):

It is noted that in General Formula (1), A, B, C, and D respectively represent repeating units represented by General Formulae (A) to (D).

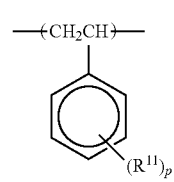

-continued

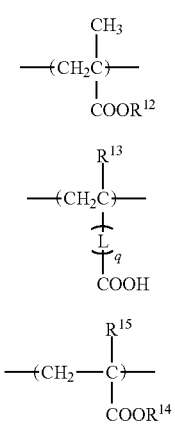

B

C

D $R^{11}$ represents a methyl group or a halogen atom, and it is preferably a methyl group, a chlorine atom, or a bromine atom, p represents an integer of 0 to 2, and it is preferably 0 or 1 and more preferably 0.

$R^{12}$ represents a methyl group or an ethyl group, and it is preferably a methyl group.

$R^{13}$ represents a hydrogen atom or a methyl group, and it is preferably a hydrogen atom. L represents a divalent linking group, and it is preferably a group represented by General Formula (2).

$$—(CO—X^1)_r—X^2— \qquad \text{General Formula (2):}$$

In General Formula (2), $X^1$ represents an oxygen atom or $—NR^{30}—$. Here, $R^{30}$ represents a hydrogen atom, an alkyl group, an aryl group, or an acyl group, each of which may have a substituent (for example, a halogen atom, a nitro group, or a hydroxyl group). $R^{30}$ is preferably a hydrogen atom, an alkyl group having 1 to 10 carbon atoms (for example, a methyl group, an ethyl group, an n-butyl group, or an n-octyl group), or an acyl group (for example, an acetyl group or a benzoyl group). $X^1$ is preferably an oxygen atom or —NH—.

$X^2$ represents an alkylene group, an arylene group, an alkylene arylene group, an arylene alkylene group, or an alkylene arylene alkylene group, and in the middle of these groups, —O—, —S—, —CO—, —COO—, —NH—, —SO$_2$—, —N($R^{31}$)—, or —N($R^{31}$)SO$_2$— may be inserted. $R^{31}$ represents a linear or branched alkyl group having 1 to 6 carbon atoms. $X^2$ is preferably a dimethylene group, a trimethylene group, a tetramethylene group, an o-phenylene group, an m-phenylene group, a p-phenylene group, —CH$_2$CH$_2$OCOCH$_2$CH$_2$—, or —CH$_2$CH$_2$OCO(C$_6$H$_4$)—.

r represents 0 or 1.

q represents 0 or 1 and preferably 0.

$R^{14}$ represents an alkyl group, an alkenyl group, or an alkynyl group, and it is preferably an alkyl group having 5 to 50 carbon atoms, more preferably an alkyl group having 5 to 30 carbon atoms, and still more preferably an alkyl group having 5 to 20 carbon atoms.

$R^{15}$ represents a hydrogen atom, a methyl group, an ethyl group, a halogen atom, or —CH$_2$COOR$^{16}$, and it is preferably a hydrogen atom, a methyl group, a halogen atom, or —CH$_2$COOR$^{16}$, more preferably a hydrogen atom, a methyl group, or —CH$_2$COOR$^{16}$, and still more preferably a hydrogen atom.

$R^{16}$ represents a hydrogen atom or an alkyl group having 1 to 80 carbon atoms and may be the same as or different from $R^{14}$. $R^{16}$ preferably has 1 to 70 carbon atoms and more preferably 1 to 60 carbon atoms.

In General Formula (1), x, y, z, and w represent a molar ratio of each repeating unit.

x is 3% to 60% by mole, and it is preferably 3% to 50% by mole and more preferably 3% to 40% by mole.

y is 30% to 96% by mole, and it is preferably 35% to 95% by mole and more preferably 40% to 90% by mole.

z is 0.5% to 25% by mole, and it is preferably 0.5% to 20% by mole and more preferably 1% to 20% by mole.

w is 0.5% to 40% by mole, and it is preferably 0.5% to 30% by mole.

In General Formula (I), a preferred case is a case where x is 3% to 40% by mole, y is 40% to 90% by mole, z is 0.5% to 20% by mole, and w is 0.5% to 10% by mole.

The polymer represented by General Formula (1) is preferably a polymer represented by General Formula (2).

General Formula (2)

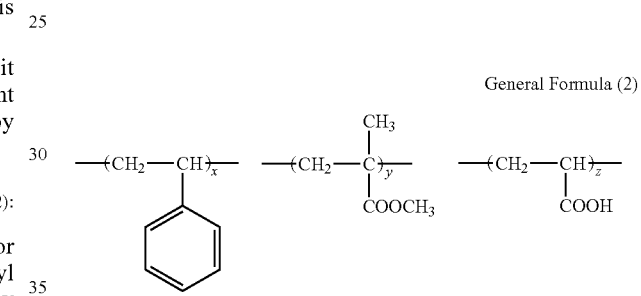

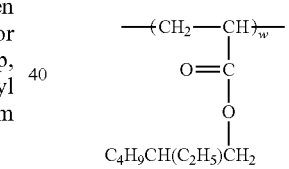

In General Formula (2), x, y, z, and w are as defined above.

The polymer represented by General Formula (1) may contain a repeating unit other than the repeating units represented by General Formulae (A) to (D) described above.

Examples of the monomers for forming other repeating units include acrylic acid esters, methacrylic acid esters, vinyl esters, olefins, crotonic acid esters, itaconic acid diesters, maleic acid diesters, fumaric acid diesters, acrylamides, unsaturated carboxylic acids, allyl compounds, vinyl ethers, vinyl ketones, vinyl heterocyclic compounds, glycidyl esters, and unsaturated nitriles. These monomers are also described in paragraphs 0010 to 0022 of JP3754745B. From the viewpoint of hydrophobicity, acrylic acid esters or methacrylic acid esters are preferable, and a hydroxyalkyl methacrylate or a hydroxyalkyl acrylate is more preferable.

The polymer represented by General Formula (1) preferably contains a repeating unit represented by General Formula (E).

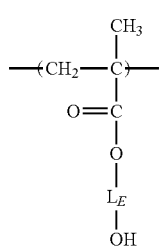

In the above formula described above, $L_E$ represents an alkylene group, and it is preferably an alkylene group having 1 to 10 carbon atoms, more preferably an alkylene group having 2 to 6 carbon atoms, and still more preferably an alkylene group having 2 to 4 carbon atoms.

The polymer represented by General Formula (1) is particularly preferably a polymer represented by General Formula (3).

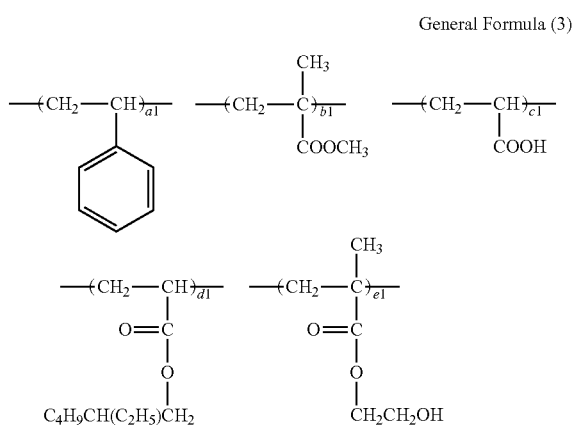

In the above formula described above, a1, b1, c1, d1, and e1 represent the molar ratio of each repeating unit, a1 represents 3 to 60 (% by mole), b1 represents 30 to 95 (% by mole), c1 represents 0.5 to 25 (% by mole), d1 represents 0.5 to 40 (% by mole), and e1 represents 1 to 10 (% by mole).

The preferred range of a1 is the same as the preferred range of the x described above, the preferred range of b1 is the same as the preferred range of the y described above, the preferred range of c1 is the same as the preferred range of the z described above, and the preferred range of d1 is the same as the preferred range of the w described above.

e1 is 1% to 10% by mole, and it is preferably 2% to 9% by mole and more preferably 2% to 8% by mole.

The specific polymer can be synthesized with reference to, for example, JP3305459B and JP3754745B.

The weight-average molecular weight of the specific polymer is not particularly limited, and it is preferably 1,000 to 1,000,000, more preferably 2,000 to 750,000, and still more preferably 3,000 to 500,000.

The conductive thin wire part may contain other materials other than the above-described material, as necessary.

Examples thereof include an antistatic agent, a nucleation accelerator, a spectral sensitizing dye, a surfactant, an anti-fogging agent, a film hardening agent, a black pepper spot preventing agent, a redox compound, a monomethine compound, and dihydroxybenzenes as described in paragraphs 0220 to 0241 of JP2009-004348A. In addition, the photosensitive layer may contain physical developing nuclei.

Further, the conductive thin wire part may contain a crosslinking agent that is used for crosslinking the above-described specific polymers to each other. In a case where a crosslinking agent is contained, the crosslinking between the specific polymers proceeds, and thus the connection between the metals in the conductive thin wire part is maintained.

The line width Wa of the conductive thin wire part is preferably less than 5.0 μm, more preferably 2.5 μm or less, and still more preferably 2.0 μm or less, from the viewpoint that the conductive thin wire part is difficult to be visible. The lower limit thereof is not particularly limited; however, it is preferably 0.5 μm or more and more preferably 1.2 μm or more from the viewpoint that the conductivity of the conductive thin wire part is more excellent. It is noted that the line width of the conductive thin wire part means the total length of the conductive thin wire part in a direction orthogonal to a direction in which the conductive thin wire part extends, among directions along the surface of the base material.

For the line width Wa of the above-described conductive thin wire part, five places corresponding to the line width of one conductive thin wire part are randomly selected by using a scanning electron microscope, and an arithmetic average value equivalent to the line widths of the five places is defined as the line width Wa.

The thickness T of the conductive thin wire part is not particularly limited: however, it is preferably 0.5 to 3.0 μm and more preferably 1.0 to 2.0 μm.

The above-described thickness T of the conductive thin wire part can be measured according to the measuring method for the thickness of the conductive layer.

The line resistance value of the conductive thin wire part is preferably less than 200 Ω/mm. Among the above, from the viewpoint of operability in a case of being used as a touch panel, it is more preferably less than 100 Ω/mm and still more preferably less than 60 Ω/mm.

The line resistance value is a value obtained by measuring a resistance value by the four point probe method and dividing it by the distance between the measurement terminals. More specifically, after disconnecting both ends of any one conductive thin wire part that constitutes a mesh pattern to cut and separate it from the mesh pattern, four (A, B, C, D) microprobes (tungsten probes (diameter: 0.5 μm), manufactured by Micro Support Co., Ltd.) are brought into contact with the cut and separated conductive thin wire part, a constant current I is applied to the outermost probes A and D using a source meter (a 2400 type general-purpose source meter, a source meter manufactured by KEITHLEY Instruments) so that a voltage V between the internal probes B and C becomes 5 mV, a resistance value Ri=V/I is measured, and the obtained resistance value Ri is divided by the distance between B and C to determine the line resistance value.

Transparent Insulating Part

The conductive layer has a transparent insulating part adjacent to the conductive thin wire part. As illustrated in FIG. 1, the conductive thin wire part and the transparent insulating part are arranged side by side on the surface of the substrate in the in-plane direction.

The transparent insulating part is a region that does not contain a conductive metal and does not exhibit conductivity. Here, the description that the transparent insulating part "does not contain a metal" means that metal content in the transparent insulating part is 0.1% by mass or less with respect to the total mass of the transparent insulating part.

The metal content in the transparent insulating part is preferably 0.05% by mass or less with respect to the total mass of the transparent insulating part.

Further, in the present specification, "transparent" means that the average light transmittance of the visible light having a wavelength of 400 to 700 nm is 80% or more. The average light transmittance of the visible light in the transparent insulating part is preferably 90% or more. The upper limit value thereof is not particularly limited, and it is, for example, 99% or less. The light transmittance can be measured using a spectrophotometer.

The transparent insulating part preferably contains a polymeric compound as a main component.

Examples of the polymeric compound contained in the transparent insulating part include the polymeric compound contained in the conductive thin wire part, and the specific polymer is preferable. Among the above, it is more preferable to contain the same polymeric compound as the polymeric compound (preferably the specific polymer) contained in the conductive thin wire part.

The description that the transparent insulating part contains a polymeric compound "as a main component" means that the content of the polymeric compound is 50% by mass or more with respect to the total mass of the transparent insulating part. The content of the polymeric compound in the transparent insulating part is preferably 90% by mass or more and more preferably 95% by mass or more. The upper limit value thereof is not particularly limited and may be 100% by mass.

A method of forming the transparent insulating part is not particularly limited. For example, in the manufacturing method for a conductive substrate described later, an exposure treatment of exposing a silver halide-containing photosensitive layer in a patterned manner is carried out to form non-exposed portions, and subsequently, the non-exposed portions are subjected to a development treatment to form a transparent insulating part containing a polymeric compound as a main component. Further, a transparent insulating part containing a specific polymer as a main component is formed by carrying out a treatment of removing gelatin as necessary.

Other Members

The conductive substrate may have other members in addition to the above-described base material and conductive thin wire part.

Examples of the other members which may be included in the conductive substrate include a conductive part having a constitution different from that of the conductive thin wire part described later.

Specific Compound

The conductive layer contains a compound represented by Formula (1) described later (hereinafter, also referred to as a "specific compound").

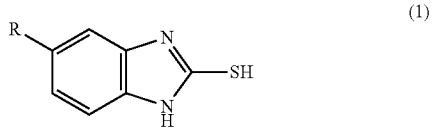

(1)

In Formula (1), R represents a hydrogen atom, an alkyl group having 1 to 4 carbon atoms, an alkoxy group having 1 to 4 carbon atoms, a halogen atom, an amino group, a nitro group, or a sulfo group or a salt thereof.

In the conductive substrate of the embodiment according to the present invention, the conductive layer contains a specific compound, and thus the sulfurization resistance of the conductive thin wire part is improved. More specifically, in the conductive substrate mounted on the electronic equipment such as the touch panel as described above, a sulfur compound derived from the peripheral members or the peripheral environment permeates into the conductive layer, and it reacts with the metal thin wire of the conductive thin wire part to form a sulfide. As a result, it is conceived that the conductivity of the conductive thin wire part is reduced. On the other hand, in a case where the conductive layer contains a specific compound, the sulfur compound that has permeated into the conductive layer from the outside reacts with the specific compound and is bonded thereto. As a result, it is presumed that the sulfurization resistance that suppresses the sulfurization of the metal thin wire is improved in the conductive thin wire part.

Hereinafter, in the present specification, the fact that the sulfurization resistance of the conductive thin wire part is excellent is also described as "the effect of the present invention is excellent".

Examples of the halogen atom represented by R include a chlorine atom, a bromine atom, and an iodine atom, where a chlorine atom is preferable.

Examples of the salt of the sulfo group represented by R include a salt of the sulfo group with a metal atom or ammonia ($NH_3$). Examples of the metal atom include alkali metal atoms such as lithium, sodium, and potassium. Among them, the sulfo group or a salt thereof is preferably a sodium sulfonate group.

From the viewpoint that the effect of the present invention is more excellent, R is preferably a hydrogen atom, an alkyl group having 1 to 4 carbon atoms, an alkoxy group having 1 to 4 carbon atoms, a chlorine atom, an amino group, or a sodium sulfonate group, more preferably a hydrogen atom, an alkyl group having 1 to 3 carbon atoms, an alkoxy group having 1 to 3 carbon atoms, or a chlorine atom, and still more preferably a hydrogen atom, a methyl group, or a methoxy group.

Examples of the specific compound include 2-mercaptobenzimidazole, 5-methyl-2-mercaptobenzimidazole, 5-ethyl-2-mercaptobenzimidazole, 5-methoxy-2-mercaptobenzimidazole, 5-ethoxy-2-mercaptobenzimidazole, 5-chloro-2-mercaptobenzimidazole, 5-amino-2-mercaptobenzimidazole, 5-nitro-2-mercaptobenzimidazole, and 2-mercapto-5-benzimidazole sodium sulfonate.

Among them, 2-mercaptobenzimidazole, 5-methyl-2-mercaptobenzimidazole, 5-ethyl-2-mercaptobenzimidazole, 5-methoxy-2-mercaptobenzimidazole, 5-ethoxy-2-mercaptobenzimidazole, or 5-chloro-2-mercaptobenzimidazole is preferable, and 2-mercaptobenzimidazole, 5-methyl-2-mercaptobenzimidazole, or 5-methoxy-2-mercaptobenzimidazole is more preferable.

Examples of the proton tautomer of the compound represented by Formula (1) include a compound represented by Formula (1a). Unless otherwise specified, the specific compound in the present specification shall also include a proton tautomer of the compound represented by Formula (1), which is represented by Formula (1a), in addition to the compound represented by Formula (1).

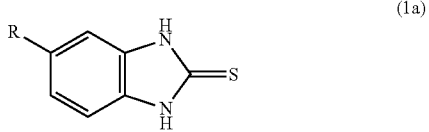

(1a)

R in Formula (1a) is the same as R in Formula (1).

On the other hand, in the compound represented by Formula (1), it is presumed that there is a compound that reacts with a metal, such as silver, constituting the metal wire in the conductive thin wire part and in which the sulfur atom of the thiol group is bonded to the metal such as silver instead of the hydrogen atom. Such a compound obtained by bonding the compound represented by Formula (1) to a metal is included in neither the compound represented by Formula (1) nor the specific compound and has low reactivity with a sulfur compound, and thus it is conceived to contribute to the improvement of sulfurization resistance.

The specific compound contained in the conductive layer may be only one kind or may be two or more kinds.

From the viewpoint that the effect of the present invention is more excellent, the content of the specific compound contained in the conductive layer is preferably 0.01 µg/cm$^2$ or more, more preferably 0.1 µg/cm$^2$ or more, and still more preferably 0.2 µg/cm$^2$ or more per area of the conductive layer.

The upper limit value of the content of the specific compound is not particularly limited: however, it is preferably 15.0 µg or less, more preferably 10.0 µg/cm$^2$ or less, and still more preferably 8.0 µg/cm$^2$ or less per area of the conductive layer from the viewpoint that the effect of suppressing the tint change of the conductive substrate after long-term storage is more excellent.

In a case where two or more kinds of specific compounds are used, the mixing ratio thereof may be freely adjusted as long as the content of the specific compound contained in the conductive layer is within the above range. In a case where the conductive layer contains two or more kinds of specific compounds, the ratio of the content of the one kind of specific compound to the content of the other kinds of specific compounds may be, for example, 0.01 to 200 in terms of mass ratio.

The specific compound may be contained in both the conductive thin wire part and the transparent insulating part, which constitute the conductive layer; however, it is preferably contained at least in the transparent insulating part.

The content of the specific compound contained in the conductive layer can be measured by immersing the conductive substrate having the conductive layer in a solvent to extract the specific compound and then quantifying the content of the specific compound in the solvent. A detailed method of measuring the content of the specific compound will be described in Examples described later.

The conductive layer may contain another compound other than the specific compound. The other compound other than the specific compound is preferably a sulfur compound containing a thiol group, and examples thereof include 2-mercaptobenzoxazole and 2-mercaptobenzothiazole.

In a case where the specific compound and the other compound are used in combination, the mixing ratio thereof may be freely adjusted as long as the content of the specific compound contained in the conductive layer is within the above range of the content. The ratio of the content of the other compound to the content of the specific compound may be, for example, 0.01 to 200 in terms of mass ratio.

The content of the other compound other than the specific compound can be measured according to the method described as the measuring method for the content of the specific compound.

The method of incorporating the specific compound in the conductive layer is not particularly limited; however, it is preferably a method of bringing the specific compound into contact with the conductive layer during the manufacture or after the manufacture of the conductive substrate after forming the conductive layer having the conductive thin wire part and the transparent insulating part, on the base material. Among the above, it is preferably a method of bringing the specific compound into contact with the conductive layer by a step P described later.

Further, the other compound other than the specific compound can be incorporated into the conductive layer according to the above method.

Manufacturing Method for Conductive Substrate

Next, a manufacturing method for a conductive substrate will be described.

The manufacturing method for a conductive substrate is not particularly limited as long as a conductive substrate having the above-described constitution can be manufactured, and a known method is adopted. Examples thereof include a method of carrying out exposure and development using a silver halide, a method of forming a metal-containing layer on the entire surface of a support, and then removing a part of the metal-containing layer using a resist pattern to form a thin wire-shaped metal-containing layer, and a method of ejecting a composition containing a metal and a resin onto a base material by a known printing method such as inkjet to form a thin wire-shaped metal-containing layer.

Among them, a method of carrying out exposure and development using a silver halide is preferable from the viewpoint that the productivity and the conductivity of the conductive thin wire part are more excellent. Specific examples thereof include a manufacturing method for a conductive substrate having a step A to a step D, which will be described later, in this order.

Hereinafter, the manufacturing method for a conductive substrate having the step A to the step D will be described in detail; however, the manufacturing method for a conductive substrate according to the embodiment of the present invention is not limited to the following manufacturing method.

Step A

The step A is a step of forming, on a base material, a silver halide-containing photosensitive layer (hereinafter, also referred to as a "photosensitive layer") containing a silver halide, gelatin, and a specific polymer (a polymeric compound different from gelatin). By this step, a base material having a photosensitive layer that is subjected to an exposure treatment described later is manufactured.

First, a material and a member, which are used in the step A, will be described in detail, and then the procedure of the step A will be described in detail.

It is noted that the base material that is used in the step A and the specific polymer is as described above.

Silver Halide

A halogen atom contained in the silver halide may be any one of a chlorine atom, a bromine atom, an iodine atom, or a fluorine atom, or it may be a combination thereof. For example, a silver halide mainly composed of silver chloride, silver bromide, or silver iodide is preferable, and a silver halide mainly composed of silver chloride or silver bromide is more preferable. It is noted that silver chlorobromide, silver iodochlorobromide, or silver iodobromide is also preferably used.

Here, for example, the "silver halide mainly composed of silver chloride" means a silver halide in which the molar fraction of ions of chlorides to the total ions of halides in the silver halide composition is 50% or more. This silver halide mainly composed of silver chloride may contain a bromide ion and/or an iodide ion in addition to the chloride ion.

The silver halide generally has a solid particle shape, and the average particle diameter of the silver halide is preferably 10 to 1,000 nm and more preferably 10 to 200 nm in terms of sphere equivalent diameter, and it is still more preferably 50 to 150 nm from the viewpoint that the change in the resistance value of the conductive thin wire part is smaller in a moist and hot environment.

Here, the sphere equivalent diameter is the diameter of spherical particles having the same volume.

The "sphere equivalent diameter" that is used as the average particle diameter of the silver halide described above is an average value, which is obtained by measuring the sphere equivalent diameters of one hundred silver halides and arithmetically averaging them.

The shape of the particle of the silver halide is not particularly limited, and examples thereof include a spherical shape, a cubic shape, a flat plate shape (a hexagonal flat plate shape, a triangular flat plate shape, a quadrangular flat plate shape, or the like), an octahedron shape, and a tetradecahedron shape.

Gelatin

The kind of gelatin is not particularly limited, and examples thereof include lime-treated gelatin and acid-treated gelatin. Further, a hydrolyzate of gelatin, an enzymatic decomposition product of gelatin, or gelatin modified with an amino group and/or a carboxyl group (phthalated gelatin or acetylated gelatin) may be used.

The photosensitive layer contains the above-described specific polymer. Since this specific polymer is contained in the photosensitive layer, the hardness of the conductive thin wire part and the transparent insulating part formed from the photosensitive layer is further improved.

Procedure of Step A

A method of forming a photosensitive layer in the step A, which contains the above-described components, is not particularly limited; however, from the viewpoint of productivity, it is preferably a method of bringing a composition for forming a photosensitive layer, containing a silver halide, gelatin, and the specific polymer, into contact with the surface of a base material and forming a photosensitive layer on the base material.

Hereinafter, a form of the composition for forming a photosensitive layer that is used in this method will be described in detail, and then the procedure of the steps will be described in detail.

Material Contained in Composition for Forming Photosensitive Layer

The composition for forming a photosensitive layer contains the above-described silver halide, gelatin, and specific polymer. It is noted that, as necessary, the specific polymer may be contained in the composition for forming a photosensitive layer in the form of a particle shape.

The composition for forming a photosensitive layer may contain a solvent, as necessary.

Examples of the solvent include water, organic solvents (for example, alcohols, ketones, amides, sulfoxides, esters, and ethers), ionic liquids, and mixed solvents thereof.

A method of bringing the composition for forming a photosensitive layer into contact with a base material is not particularly limited, and examples thereof include a method of applying the composition for forming a photosensitive layer onto a base material and a method of immersing a base material in the composition for forming a photosensitive layer.

After the above-described treatment, a drying treatment may be carried out as necessary.

Silver Halide-Containing Photosensitive Layer

The photosensitive layer formed according to the above-described procedure contains a silver halide, gelatin, and the specific polymer.

The content of the silver halide in the photosensitive layer is not particularly limited and, from the viewpoint that the conductivity of the conductive substrate is more excellent, it is preferably 3.0 to 20.0 $g/m^2$ and more preferably 5.0 to 15.0 $g/m^2$ in terms of silver. "In terms of silver" means that all the silver halide is converted into the mass of silver to be generated by reducing all the silver halide.

The content of the specific polymer in the photosensitive layer is not particularly limited, and it is preferably 0.04 to 2.0 $g/m^2$, more preferably 0.08 to 0.40 $g/m^2$, and still more preferably 0.10 to 0.40 $g/m^2$, from the viewpoint that the conductivity of the conductive substrate is more excellent.

Step B

The step B is a step of exposing the photosensitive layer and then subjecting it to a development treatment to form a thin wire-shaped silver-containing layer containing a metallic silver, gelatin, and a specific polymer.

In a case where the photosensitive layer is subjected to an exposure treatment, a latent image is formed in the exposed region.

The exposure may be carried out in a patterned manner. In order to obtain a mesh pattern consisting of a conductive thin wire part, which will be described later, examples of the exposure method include a method of carrying out exposure through a mask having a mesh-shaped opening pattern and a method of carrying out exposure in a mesh shape by carrying out scanning using laser light.

The kind of light that is used for exposure is not particularly limited as long as a latent image can be formed on the silver halide, and examples thereof include visible light, ultraviolet rays, and X-rays.

In a case where the exposed photosensitive layer is subjected to a development treatment, metallic silver is precipitated in the exposed region (the region where a latent image is formed).

The method of the development treatment is not particularly limited, and examples thereof include known methods that are used for a silver salt photographic film, photographic printing paper, a printing plate making film, and an emulsion mask for a photomask.

In the development treatment, a developer is generally used. The kind of developer is not particularly limited, and examples thereof include a phenidone hydroquinone (PQ) developer, a metol hydroquinone (MQ) developer, and a metol/ascorbic acid (MAA) developer.

This step may further include a fixing treatment that is carried out for the purpose of removing and stabilizing the silver halide of non-exposed portions.

The fixing treatment is carried out simultaneously with development and/or after development. The method of the fixing treatment is not particularly limited, and examples thereof include methods that are used for a silver salt photographic film, photographic printing paper, a printing plate making film, and an emulsion mask for a photomask.

In the fixing treatment, a fixing liquid is generally used. The kind of fixing liquid is not particularly limited, and examples thereof include the fixing liquid described in "Chemistry of Photographs" (written by Sasai, Photo Industry Publishing Co., Ltd.) p 321.

In a case where the above-described treatment is carried out, a thin wire-shaped silver-containing layer containing metallic silver, gelatin, and the specific polymer is formed, and at the same time, an insulating layer containing no metallic silver but containing gelatin and a specific polymer is formed.

Examples of the method of adjusting the width of the silver-containing layer include a method of adjusting the opening width of a mask that is used at the time of exposure. It is possible to adjust the exposed region, for example, by setting the opening width of the mask to 1.0 µm or more and less than 5.0 µm.

Further, in a case where a mask is used at the time of exposure, the width of the silver-containing layer to be formed can be adjusted by adjusting the exposure amount. For example, in a case where the opening width of the mask is narrower than the target width of the silver-containing layer, the width of the region where a latent image is formed can be adjusted by increasing the exposure amount more than usual. That is, the line width of the conductive thin wire part can be adjusted with the exposure amount.

Further, in a case where the laser light is used, the exposed region can be adjusted by adjusting the focusing range and/or the scanning range of the laser light.

The width of the silver-containing layer is preferably 1.0 µm or more and less than 5.0 µm and more preferably 2.0 µm or less from the viewpoint that the conductive thin wire part to be formed is difficult to visible.

Here, the silver-containing layer obtained according to the above-described procedure has a thin wire shape, and the width of the silver-containing layer means the length (the width) of the silver-containing layer in a direction orthogonal to the direction in which the thin wire-shaped silver-containing layer extends.

Step C

The step C is a step of subjecting the silver-containing layer and the insulating layer (hereinafter, both are also referred to as a "silver-containing layer and the like"), which are obtained in the step B, to a heating treatment. In a case where this step is carried out, fusion welding between specific polymers in the silver-containing layer and the like progress, and thus the hardness of the silver-containing layer and the like is improved.

The method of the heating treatment is not particularly limited, and examples thereof include a method of bringing the silver-containing layer and the like into contact with superheated vapor and a method of carrying out heating with a temperature adjusting device (for example, a heater), and a method of bringing the silver-containing layer and the like into contact with superheated vapor is preferable.

The superheated vapor may be superheated steam or may be a mixture obtained by mixing superheated steam with another gas.

The time of contact between the superheated vapor and the silver-containing layer and the like is not particularly limited, and it is preferably 10 to 70 seconds.

The supply amount of the superheated vapor is preferably 500 to 600 g/m$^3$, and the temperature of the superheated vapor is preferably 100° C. to 160° C. (preferably 100° C. to 120° C.) at 1 atm.

As the heating conditions in the method of heating the silver-containing layer and the like with a temperature adjusting device, conditions of heating at 100° C. to 200° C. (preferably 100° C. to 150° C.) for 1 to 240 minutes (preferably 60 to 150 minutes) are preferable.

Step D

The step D is a step of removing gelatin in the silver-containing layer or the like obtained in the step C. In a case where this step is carried out, gelatin is removed from the silver-containing layer and the like, and thus a space is formed in the inside of the silver-containing layer and the like.

The method of removing gelatin is not particularly limited, and examples thereof include a method of using a proteolytic enzyme (hereinafter, also referred to as a "method 1") and a method of decomposing and removing gelatin using an oxidizing agent (hereinafter, also referred to as a "method 2").

Examples of the proteolytic enzyme that is used in the method 1 include enzymes known as vegetable or animal enzymes that are capable of hydrolyzing proteins such as gelatin.

Examples of the proteolytic enzyme include pepsin, rennin, trypsin, chymotrypsin, cathepsin, papain, ficin, thrombin, renin, collagenase, bromelain, and a bacterial protease, and trypsin, papain, ficin, or a bacterial protease is preferable.

A method of bringing the silver-containing layer and the like into contact with the above-described proteolytic enzyme suffices as the procedure in the method 1, and examples thereof include a method of bringing the silver-containing layer and the like into contact with a treatment liquid (hereinafter, also referred to as an "enzyme solution") containing a proteolytic enzyme. Examples of the contact method include a method of immersing the silver-containing layer and the like in the enzyme solution and a method of applying the enzyme solution onto the silver-containing layer and the like.

The content of the proteolytic enzyme in the enzyme solution is not particularly limited, and it is preferably 0.05% to 20% by mass and more preferably 0.5% to 10% by mass with respect to the total amount of the enzyme solution from the viewpoint that degree of decomposition and removal of the gelatin is easily controlled.

The enzyme solution contains water in addition to the above-described proteolytic enzyme in a large number of cases.

As necessary, the enzyme solution may contain other additives (for example, a pH buffering agent, an antibacterial compound, a wetting agent, and a preservative).

The pH of the enzyme solution is selected so that the action of the enzyme can be obtained to the maximum; however, it is preferably 5 to 9.

The temperature of the enzyme solution is preferably a temperature at which the action of the enzyme is enhanced. Specifically, 20° C. to 45° C. is preferable.

As necessary, a washing treatment in which the obtained silver-containing layer and the like are washed with warm water after the treatment with the enzyme solution may be carried out.

The washing method is not particularly limited, and a method of bringing the silver-containing layer and the like into contact with warm water is preferable. Examples thereof include a method of immersing the silver-containing layer and the like in warm water and a method of applying warm water onto the silver-containing layer and the like.

Regarding the temperature of the warm water, an optimum temperature is appropriately selected according to the kind of proteolytic enzyme to be used, and it is preferably 20° C. to 80° C. and more preferably 40° C. to 60° C. from the viewpoint of productivity.

The time (the washing time) of contact between the warm water and the silver-containing layer and the like is not particularly limited, and it is preferably 1 to 600 seconds and more preferably 30 to 360 seconds from the viewpoint of productivity.

The oxidizing agent that is used in the method 2 may be any oxidizing agent capable of decomposing gelatin, and an oxidizing agent having a standard electrode potential of +1.5 V or higher is preferable. Here, the standard electrode potential is intended to be a standard electrode potential (25° C., E0) of the oxidizing agent with respect to the standard hydrogen electrode in the aqueous solution.

Examples of the oxidizing agent described above include persulfuric acid, percarbonic acid, perphosphoric acid, $HClO_5$, peracetic acid, metachloroperbenzoic acid, hydrogen peroxide water, perchloric acid, periodic acid, potassium permanganate, ammonium persulfate, ozone, and hypochlorous acid, however, from the viewpoint of productivity and economy, it is preferably hydrogen peroxide water (standard electrode potential: 1.76 V) or hypochlorous acid or a salt thereof, and more preferably sodium hypochlorite.

A method of bringing the silver-containing layer and the like into contact with the above-described oxidizing agent suffices as the procedure in the method 2, and examples thereof include a method of bringing the silver-containing layer and the like into contact with a treatment liquid (hereinafter, also referred to as an "oxidizing agent solution") containing an oxidizing agent. Examples of the contact method include a method of immersing the silver-containing layer and the like in the oxidizing agent solution and a method of applying the oxidizing agent solution onto the silver-containing layer and the like.

The kind of solvent contained in the oxidizing agent solution is not particularly limited, and examples thereof include water and an organic solvent.

Step E

The manufacturing method for a conductive substrate may include a step E of subjecting the silver-containing layer obtained in the step D to a plating treatment. In a case of carrying out this step, it is possible to fill the space inside the silver-containing layer formed by removing gelatin with a metal (a plating metal) and improve the conductivity of the conductive thin wire part.

The kind of plating treatment is not particularly limited. However, examples thereof include electroless plating (chemical reduction plating or displacement plating), and electrolytic plating, and electroless plating is preferable. As the electroless plating, a known electroless plating technique is used.

Examples of the plating treatment include a silver plating treatment, a copper plating treatment, a nickel plating treatment, and a cobalt plating treatment, where a silver plating treatment or a copper plating treatment is preferable and a silver plating treatment is more preferable from the viewpoint that the conductivity of the conductive thin wire part is more excellent.

The components contained in the plating liquid that is used in the plating treatment are not particularly limited; however, in general, the plating liquid mainly contains, in addition to a solvent (for example, water), 1: metal ions for plating, 2: a reducing agent, 3: an additive (a stabilizing agent) that improves the stability of metal ions, and 4: a pH adjusting agent. In addition to these, the plating liquid may contain a known additive such as a stabilizing agent for the plating liquid.

The kind of metal ions for plating, contained in the plating liquid, can be appropriately selected depending on the kind of metals to be precipitated, and examples thereof include a silver ion, a copper ion, a nickel ion, and a cobalt ion.

The procedure of the above-described plating treatment is not particularly limited as long as it is a method of bringing the silver-containing layer into contact with the plating liquid, and examples thereof include a method of immersing the silver-containing layer in the plating liquid and a method of applying the plating liquid onto the silver-containing layer.

The time of contact between the silver-containing layer and the plating liquid is not particularly limited, and it is preferably 20 seconds to 30 minutes from the viewpoints of the more excellent conductivity of the conductive thin wire part and productivity.

Step F

The manufacturing method for a conductive substrate may further include a step F of subjecting the silver-containing layer and the like obtained in the above-described step to a smoothing treatment.

A method of carrying out the smoothing treatment is not particularly limited, and it is, for example, preferably a calender treatment step of causing a base material having a silver-containing layer and the like to pass between at least a pair of rolls under pressure. Hereinafter, the smoothing treatment using a calender roll will be referred to as a calender treatment.

Examples of the roll that is used in the calender treatment include a plastic roll and a metal roll, where a plastic roll is preferable from the viewpoint of preventing wrinkles.

The pressure between rolls is not particularly limited. It is preferably 2 MPa or more and more preferably 4 MPa or more, and it is preferably 120 MPa or less. The pressure between rolls can be measured using PRESCALE (for high pressure) manufactured by FUJIFILM Corporation.

The smoothing treatment temperature is not particularly limited; however, it is preferably 10° C. to 100° C. and more preferably 10° C. to 50° C.

Step G

The manufacturing method for a conductive substrate may include a step G of subjecting the silver-containing layer and the like obtained in the above-described step to a heating treatment. In a case where this step is carried out, a conductive thin wire part having more excellent conductivity can be obtained.

A method of subjecting the conductive thin wire part to the heating treatment is not particularly limited, and examples thereof include the method described in the step C.

Step H

The manufacturing method for a conductive substrate may have a step H of forming a silver halide-free layer containing gelatin and the specific polymer on the base material before the step A. In a case where this step is carried out, a silver halide-free layer is formed between the base material and the silver halide-containing photosensitive layer. This silver halide-free layer serves as a so-called antihalation layer and contributes to improving the adhesiveness between the conductive layer and the base material.

The silver halide-free layer contains the above-described gelatin and specific polymer. On the other hand, the silver halide-free layer does not contain a silver halide.

The ratio of the mass of the specific polymer to the mass of the gelatin (the mass of the specific polymer/the mass of the gelatin) in the silver halide-free layer is not particularly limited, and it is preferably 0.1 to 5.0 and more preferably 1.0 to 3.0.

The content of the specific polymer in the silver halide-free layer is not particularly limited. It is 0.03 $g/m^2$ or more in a large number of cases, and it is preferably 1.0 $g/m^2$ or more from the viewpoint that the adhesiveness of the conductive thin wire part is more excellent. The upper limit thereof is not particularly limited and is 1.63 $g/m^2$ or less in a large number of cases.

A method of forming the silver halide-free layer is not particularly limited, and examples thereof include a method of applying a composition for forming a layer, containing gelatin and the specific polymer, onto a base material and carrying out a heating treatment as necessary.

For example, the composition for forming a layer may contain a solvent as necessary. Examples of the kind of solvent include the solvent that is used in the above-described composition for forming a photosensitive layer.

The thickness of the silver halide-free layer is not particularly limited. It is 0.05 µm or more in a large number of cases, and it is preferably more than 1.0 µm and more preferably 1.5 µm or more from the viewpoint that the adhesiveness of the conductive thin wire part is more excellent. The upper limit thereof is not particularly limited; however, it is preferably less than 3.0 µm.

Step I

The manufacturing method for a conductive substrate may have a step I of forming a protective layer containing gelatin and the specific polymer on the silver halide-containing photosensitive layer after the step A and before the step B. In a case where a protective layer is provided, it is possible to prevent scratches on the photosensitive layer and improve the mechanical characteristics.

The ratio of the mass of the specific polymer to the mass of the gelatin (the mass of the specific polymer/the mass of the gelatin) in the protective layer is not particularly limited, and it is preferably more than 0 and 2.0 or less, and more preferably more than 0 and 1.0 or less.

Further, the content of the specific polymer in the protective layer is not particularly limited, and it is preferably more than 0 g/m$^2$ and 0.3 g/m$^2$ or less, and more preferably 0.005 to 0.1 g/m$^2$.

A method of forming the protective layer is not particularly limited, and examples thereof include a method of applying a composition for forming a protective layer, containing gelatin and the specific polymer, onto the silver halide-containing photosensitive layer and carrying out a heating treatment as necessary.

For example, the composition for forming a protective layer may contain a solvent as necessary. Examples of the kind of solvent include the solvent that is used in the above-described composition for forming a photosensitive layer.

The thickness of the protective layer is not particularly limited, and it is preferably 0.03 to 0.3 µm and more preferably 0.075 to 0.20 µm.

The above-described step H, step A, and step 1 may be simultaneously carried out by simultaneous multilayer coating.

Step P

The manufacturing method for a conductive substrate includes a step P of bringing a specific compound into contact with the conductive layer formed on the above-described base material to produce the conductive substrate according to the embodiment of the present invention in which the specific compound is contained in the conductive layer.

A method of bringing the conductive layer into contact with the specific compound is not particularly limited, and examples thereof include a method of immersing a base material, on which the conductive layer is formed, in a treatment liquid containing the specific compound, and a method of applying a treatment liquid containing the specific compound onto the surface of the base material, on which the conductive layer is formed.

In a case where the step P is carried out to allow the specific compound to permeate into and adsorb to the conductive thin wire part and the transparent insulating part, which constitute the conductive layer, the sulfurization resistance of the conductive thin wire part is improved.

The above-described treatment liquid containing the specific compound is preferably a solution obtained by dissolving the specific compound in a solvent. The kind of solvent to be used is not particularly limited, and examples thereof include the solvent that is used in the above-described composition for forming a photosensitive layer. Examples of the preferred solvent include alcohols and ethers. Specific examples of the preferred solvent include ethanol, 1-propanol, 2-propanol, ethylene glycol propyl ether (more preferably, ethylene glycol monopropyl ether), ethylene glycol butyl ether (more preferably, ethylene glycol monobutyl ether), propylene glycol propyl ether (more preferably, propylene glycol monopropyl ether), and diethylene glycol butyl ether (more preferably, diethylene glycol monobutyl ether).

The content of the specific compound in the above-described treatment liquid may be appropriately determined according to the amount of the specific compound to be incorporated into the target conductive layer and the treatment conditions; however, it is preferably 0.01% to 2% by mass and more preferably 0.1% to 0.5% by mass with respect to the total mass of the treatment liquid.

The temperature of the treatment liquid in a case where the treatment liquid is brought into contact with the conductive layer is, for example, 25° C. to 60° C.

The time of contact between the specific compound and the conductive layer is not particularly limited; however, it is preferably 0.1 to 10 minutes and more preferably 0.2 to 3 minutes.

Use Application of Conductive Substrate

The conductive substrate obtained as described above can be applied to various use applications, and for example, it can be applied to use applications such as a touch panel (or a touch panel sensor), a semiconductor chip, various electrical wiring plates, flexible printed circuits (FPC), a chip on film (COF), tape automated bonding (TAB), an antenna, a multilayer interconnection board, and a motherboard. Among these, the present conductive substrate is preferably used in a touch panel (a capacitance-type touch panel).

In the touch panel having the present conductive substrate, the above-described conductive thin wire part can effectively function as a detection electrode. In a case where the present conductive substrate is used in a touch panel, examples of the display panel that is used in combination with the conductive substrate include a liquid crystal panel and an organic light emitting diode (OLED) panel, where a combination with an OLED panel is preferable.

It is noted that the conductive substrate may have a conductive part having a constitution different from that of the conductive layer, in addition to the conductive layer having a conductive thin wire part. This conductive part may be electrically connected to the above-described conductive thin wire part to conduct electricity. Examples of the conductive part include a peripheral wire having a function of applying a voltage to the above-described conductive thin wire part and an alignment mark for adjusting the position of a member to be laminated with that of the conductive substrate.

Examples of the use application of the present conductive substrate other than those described above include an electromagnetic wave shield that blocks electromagnetic waves such as radio waves and microwaves (ultra-high frequency radio waves), generated from electronic apparatuses such as a personal computer and a workstation and prevents static electricity. Such an electromagnetic wave shield can be used not only for the main body of the personal computer but also for an electronic apparatus such as a videographing apparatus or an electronic medical apparatus.

The present conductive substrate can also be used for a transparent exothermic body.

This conductive substrate may be used in the form of a laminate having a conductive substrate and other members such as a pressure-sensitive adhesive sheet and a peeling sheet during handling and transportation. The peeling sheet functions as a protective sheet for preventing the occurrence of scratching on the conductive substrate during transportation of the laminate.

Further, the conductive substrate may be handled in the form of a composite body having, for example, a conductive substrate, a pressure-sensitive adhesive sheet, and a protective layer in this order.

The present invention is basically constituted as described above. The conductive substrate according to the embodiment of the present invention has been described in detail; however, the present invention is not limited to the above-described embodiments, and various improvements or modifications may be made without departing from the gist of the present invention.

EXAMPLES

Hereinafter, the present invention will be described in more detail with reference to Examples of the present invention. The materials, amounts of use, proportions, treatment contents, treatment procedures, and the like shown in the following Examples can be appropriately modified without departing from the spirit of the present invention. Accordingly, the scope of the present invention should not be construed as being limited to specific examples shown below.

Example 1

Preparation of Silver Halide Emulsion

The following liquid 2 and liquid 3 were added simultaneously in amounts corresponding to 90% of an entire amount of each thereof over 20 minutes to the following liquid 1 kept at 38° C. and a pH of 4.5 while stirring the liquid 1, whereby nuclear particles having a size of 0.16 μm were formed. Subsequently, the following liquid 4 and liquid 5 were added over 8 minutes to the obtained solution, and the remaining 10% amount of each of the following liquid 2 and liquid 3 was further added over 2 minutes, whereby the nuclear particles grew to a size of 0.21 μm. Further, 0.15 g of potassium iodide was added to the obtained solution, which was subsequently aged for 5 minutes to complete particle formation.

| Liquid 1: | |
|---|---|
| Water | 750 ml |
| Gelatin | 8.6 g |
| Sodium chloride | 3 g |
| 1,3-dimethylimidazolidine-2-thione | 20 mg |
| Sodium benzenethiosulfonate | 10 mg |
| Citric acid | 0.7 g |
| Liquid 2: | |
| Water | 300 ml |
| Silver nitrate | 150 g |
| Liquid 3: | |
| Water | 300 ml |
| Sodium chloride | 38 g |
| Potassium bromide | 32 g |
| Potassium hexachloroiridate (III) (0.005% KCl 20% aqueous solution) | 5 ml |
| Ammonium hexachlororhodate (0.001% NaCl 2.0% aqueous solution) | 7 ml |
| Liquid 4: | |
| Water | 100 ml |
| Silver nitrate | 50 g |
| Liquid 5: | |
| Water | 100 ml |
| Sodium chloride | 13 g |
| Potassium bromide | 11 g |
| Yellow prussiate of potash | 5 mg |

This was followed by water washing using a flocculation method according to a conventional method. Specifically, the temperature of the obtained solution described above was decreased to 35° C. and the pH thereof was decreased (the pH thereof was in a range of 3.6±0.2) using sulfuric acid until silver halide was precipitated. Next, about 3 L of the supernatant solution was removed from the obtained solution (the first water washing). Next, 3 L of distilled water was added to the solution from which the supernatant solution had been removed, and then sulfuric acid was added thereto until the silver halide was precipitated, 3 L of the supernatant solution was removed again from the obtained solution (the second water washing). The same operation as the second water washing was repeated once more (the third water washing), whereby the water washing and desalting steps were completed. The emulsion after water washing and desalting was adjusted to have a pH of 6.4 and a pAg of 7.5, and then 2.5 g of gelatin, 10 mg of sodium benzenethiosulfonate, 3 mg of sodium benzenethiosulfinate, 15 mg of sodium thiosulfate, and 10 mg of chloroauric acid were added thereto, and chemosensitization was carried out at 55° C. so that the optimum sensitivity was obtained. Then, 100 mg of 1,3,3a,7-tetraazaindene as a stabilizing agent and 100 mg of PROXEL (product name, manufactured by ICI Co., Ltd.) as a preservative were further added to the obtained emulsion. The finally obtained emulsion was an emulsion of cubic silver chlorobromide particles containing 0.08% by mole of silver iodide, where the rate of silver chlorobromide was 70% by mole of silver chloride and 30% by mole of silver bromide, and the average particle diameter (in terms of sphere equivalent diameter) was 200 nm and the coefficient of variation was 9%.

Preparation of Composition for Forming Photosensitive Layer 1,3,3a,7-tetraazaindene ($1.2 \times 10^{-4}$ mol/mol Ag), hydroquinone ($1.2 \times 10^{-2}$ mol/mol Ag), citric acid ($3.0 \times 10^{-4}$ mol/mol Ag), 2,4-dichloro-6-hydroxy-1,3,5-triazine sodium salt (0.90 g/mol Ag), and a trace amount of a hardening agent were added to the emulsion, thereby obtaining a composition. The pH of the composition was then adjusted to 5.6 using citric acid.

A polymer latex containing a polymer represented by (P-1) shown below (hereinafter, also referred to as a "polymer 1"), a dispersing agent consisting of a dialkylphenyl PEO (PEO is an abbreviation for polyethylene oxide) sulfuric acid ester, and water (in the polymer latex, the ratio of the mass of the dispersing agent to the mass of the polymer 1 (the mass of the dispersing agent/the mass of the polymer 1, unit: g/g) is 0.02, and the solid content is 22% by mass) was added to the above composition so that the ratio of the mass of the polymer 1 to the total mass of the gelatin in the composition (the mass of the polymer 1/the mass of the gelatin, unit: g/g) was 0.25/1, whereby a polymer latex-containing composition was obtained. Here, in the polymer latex-containing composition, the ratio of the mass of the gelatin to the mass of the silver derived from the silver halide (the mass of the gelatin/the mass of the silver derived from the silver halide, unit: g/g) was 0.11.

Further, EPOXY RESIN DY 022 (product name: manufactured by Nagase ChemteX Corporation) was added as a crosslinking agent. The adding amount of the crosslinking agent was adjusted so that the amount of the crosslinking agent in the silver halide-containing photosensitive layer which will be described later was 0.09 g/m².

In such a manner as described above, a composition for forming a photosensitive layer was prepared.

It is noted that the polymer 1 was synthesized with reference to JP3305459B and JP3754745B.

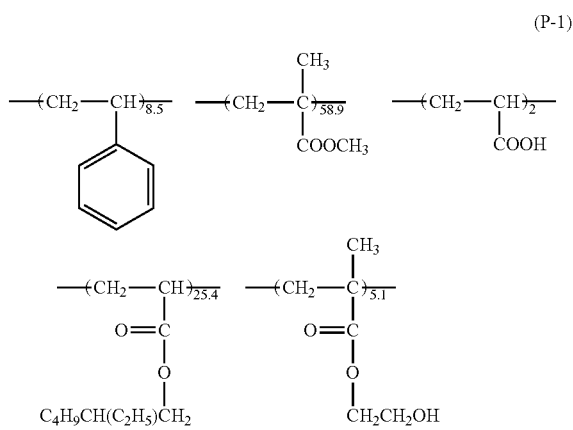
(P-1)

Formation of Undercoat Layer

The above-described polymer latex was applied onto the surface of a base material consisting of a polyethylene terephthalate film having a thickness of 40 μm ("a long roll-shaped film manufactured by FUJIFILM Corporation") to provide an undercoat layer having a thickness of 0.05 μm. This treatment was carried out in a roll-to-roll manner, and each of the following treatments (steps) was also carried out in the same manner as the roll-to-roll manner. Here, the roll width was 1 m, and the roll length was 1,000 m.

Step H1, step A1, and step I1

Next, a composition for forming a silver halide-free layer, in which the above-described polymer latex and gelatin were mixed, the above-described composition for forming a photosensitive layer, and a composition for forming a protective layer, in which the polymer latex and gelatin were mixed were simultaneously applied by multilayer coating onto the undercoat layer, and then a silver halide-free layer, a silver halide-containing photosensitive layer, and a protective layer were formed on the undercoat layer.

It is noted that the thickness of the silver halide-free layer was 2.0 μm, the mixing mass ratio of the polymer 1 to the gelatin in the silver halide-free layer (the polymer 1/the gelatin) was 2/1, and the content of the polymer 1 was 1.3 g/m².

In addition, the thickness of the silver halide-containing photosensitive layer was 2.5 μm, the mixing mass ratio of the polymer 1 to the gelatin in the silver halide-containing photosensitive layer (the polymer 1/the gelatin) was 0.25/1, and the content of the polymer 1 was 0.19 g/m².

Further, the thickness of the protective layer was 0.15 μm, the mixing mass ratio of the polymer 1 to the gelatin in the protective layer (the polymer 1/the gelatin) was 0.1/1, and the content of the polymer 1 was 0.015 g/m².

Step B1

The produced photosensitive layer described above was exposed through a lattice-shaped photo mask using parallel light with a high-pressure mercury lamp as a light source (hereinafter, also referred to as a "mesh pattern electrode"). The mask for forming a pattern was used as a photo mask, where the line width of the unit square lattice that forms the lattice as illustrated in FIG. 2 was 1.2 μm, and the length L of one side of the lattice (the opening portion) was 600 μm.

After the exposure, the obtained sample was developed with a developer which will be described later, and further subjected to a development treatment using a fixing liquid (product name: N3X-R for CN16X, manufactured by FUJIFILM Corporation). Then, rinsing was carried out with pure water at 25° C., and drying was carried out, thereby obtaining a sample A which has a conductive layer containing a conductive thin wire part containing a metallic silver and has a transparent insulating part, where the conductive thin wire part is formed in a comb-type patterned manner, and a sample B which has a conductive layer containing a conductive thin wire part containing a metallic silver and has a transparent insulating part, where the conductive thin wire part is formed in a mesh patterned manner. In the sample B, a conductive mesh pattern region having a size of 21.0 cm×29.7 cm was formed.

Composition of Developer

The following compounds are contained in 1 liter (L) of the developer.

Hydroquinone 0.037 mol/L
N-methylaminophenol 0.016 mol/L
Sodium metaborate 0.140 mol/L
Sodium hydroxide 0.360 mol/L
Sodium bromide 0.031 mol/L
Potassium metabisulfite 0.187 mol/L The obtained samples described above were immersed in warm water at 50° C. for 180 seconds. Then, the sample A was drained with an air shower and allowed to be air-dried.

Step C1

The sample obtained in the step B1 was carried into a superheated steam treatment tank at 110° C. and allowed to stand for 30 seconds for the superheated steam treatment. The steam flow rate at this time was 100 kg/h.

Step D1

The sample obtained in the step C1 was immersed in an aqueous proteolytic enzyme solution (40° C.) for 30 seconds. The sample was taken out from the aqueous proteolytic enzyme solution, and the sample was immersed and washed in warm water (liquid temperature: 50° C.) for 120 seconds. Then, the sample was drained with an air shower and allowed to be air-dried.

The aqueous proteolytic enzyme solution used was prepared according to the following procedure.

Triethanolamine and sulfuric acid were added to an aqueous solution of a proteolytic enzyme (BIOPRASE 30L, manufactured by Nagase ChemteX Corporation) (proteolytic enzyme concentration: 0.5% by mass), and the pH was adjusted to 8.5.

Step G1

The sample obtained in the step D1 was carried into a superheated steam treatment tank at 110° C. and allowed to stand for 30 seconds for the superheated steam treatment. The steam flow rate at this time was 100 kg/h.

Step P1

The sample obtained in the step G1 was immersed in the treatment liquid A (25° C.) for 90 seconds. The sample was taken out from the treatment liquid A, and the sample was immersed and washed in water at 25° C. for 30 seconds. The composition of the treatment liquid A (total amount: 1,200 g) was as follows. In addition, the following components used were all manufactured by FUJIFILM Wako Pure Chemical Corporation.

| Composition of treatment liquid A | |
|---|---|
| 2-mercaptobenzimidazole | 2.4 g |
| Ethanol | 600 g |
| Water | remainder |

Drying Step

The sample obtained in the step P1 was heated at 65° C. for 90 seconds and dried.

By the above steps, a sample having a mesh pattern electrode was produced.

Examples 2 to 18

In Examples 2 to 18, each of the treatment liquids shown in Table 1 described later were prepared as the treatment liquid for immersing a sample in the above step P1.

In Examples 2 to 11, the specific compounds shown in Table 1 described later were used instead of 2-mercaptobenzimidazole.

In Example 12, 2-mercaptobenzimidazole and 5-methyl-2-mercaptobenzimidazole were used as specific compounds so that the amounts thereof were 90/10 in terms of the mass ratio of 2-mercaptobenzimidazole/5-methyl-2-mercaptobenzimidazole.

In Example 13, 2-mercaptobenzimidazole and 2-mercapto-5-benzimidazole sulfonate were used as specific compounds so that the amounts thereof were 85/15 in terms of the mass ratio of 2-mercaptobenzimidazole/2-mercapto-5-benzimidazole sulfonate.

In Example 14, in addition to 2-mercaptobenzimidazole, 2-mercaptobenzoxazole, which is another sulfur compound other than the specific compound, was used.

Further, in Examples 12 to 18, treatment liquids were prepared by using the solvents shown in Table 1 described later. In Examples 12 to 14, a mixed solvent containing water and ethanol was used, where the mixing ratio (in terms of mass ratio) of water/ethanol was 85/15. In Examples 15 to 18, a mixed solvent containing water, ethanol, and each of the ethers shown in Table 1 described later was used, where the mixing ratio (in terms of mass ratio) of water/ethanol/each ether was 85/7.5/7.5.

Each of the samples of the conductive substrates of Examples 2 to 13 and 15 to 18 was produced according to the procedure described in Example 1, except that at the time of preparing the treatment liquid to be used in step P1, the kind and content of the specific compound and solvent to be contained in the treatment liquid were appropriately adjusted so that the content of the specific compound per area of the conductive layer was the numerical value shown in Table 1 described later.

Similarly, a sample of the conductive substrate of Example 14 was produced according to the procedure described in Example 1, except that at the time of preparing the treatment liquid to be used in step P1, the kind and content of the specific compound, another sulfur compound, and solvent to be contained in the treatment liquid were appropriately adjusted so that the contents of the specific compound and another sulfur compound per area of the conductive layer were the numerical values shown in Table 1 described later.

The used components of the treatment liquid were all manufactured by FUJIFILM Wako Pure Chemical Corporation.

Example 19

Step E1

The sample of Example 1 obtained in the step D1 was immersed in a plating liquid (30° C.) having the following composition for 5 minutes. The sample was taken out from the plating liquid, and it was immersed and washed in warm water (50° C.) for 120 seconds.

The composition of the plating liquid (total amount: 1,200 ml) was as follows. The pH of the plating liquid was 9.9, where the pH was adjusted by adding a predetermined amount of potassium carbonate (manufactured by FUJIFILM Wako Pure Chemical Corporation). In addition, the following components used were all manufactured by FUJIFILM Wako Pure Chemical Corporation.

| Composition of plating liquid | |
|---|---|
| $AgNO_3$ | 2.1 g |
| Sodium sulfite | 86 g |
| Sodium thiosulfate pentahydrate | 60 g |
| Aron T-50 (manufactured by Toagosei Co., Ltd., concentration of solid contents 40%) | 36 g |
| Methyl hydroquinone | 13 g |
| Potassium carbonate | predetermined amount |
| Water | remainder |

A sample of the conductive substrate was produced according to the procedure described in Example 1, except that in the step P1, the sample obtained in the step E1 was used instead of the sample obtained in the step D1, and 5-methyl-2-mercaptobenzimidazole was used instead of 2-mercaptobenzimidazole.

Examples 20 and 21

As the treatment liquid for immersing a sample in the above step P1, a treatment liquid containing the specific compound shown in Table 1 described later instead of 2-mercaptobenzimidazole was prepared. A sample of the conductive substrate was produced according to the procedure described in Example 12, except that the kind and content of the specific compound to be contained in the treatment liquid to be used in step the P1 were appropriately adjusted.

Comparative Examples 1 and 2

A sample of the conductive substrate was produced according to the procedure described in Example 1, except that the sample obtained in the step D1 was not subjected to the step P1 but subjected to the step G1 (Comparative Example 1).

In addition, a sample of the conductive substrate was produced according to the procedure described in Example 12, except that the sample obtained in the step E1 was not subjected to the step P1 but subjected to the step G1 (Comparative Example 2).

Measurement and Evaluation

Quantification of Specific Compound

The content of the specific compound contained in each of the conductive substrates produced in Examples and Comparative Examples was quantified by the following method.

The produced sample was cut into a size of 1 cm×1 cm. Fifteen cut samples were immersed in 100 ml of ethanol (temperature: 30° C.) and allowed to stand for 24 hours to extract the specific compounds contained in the samples.

After taking out the sample from the ethanol solution, the ethanol solution containing the extracted specific compound was subjected to the measurement by the high performance liquid chromatography (HPLC) method under the following measurement conditions, and the absolute calibration curve method was used to quantify the specific compound.

Table 1 described later shows the content (unit: µg/cm$^2$) of the specific compound contained in each sample.

It is noted that as a result of quantifying the specific compound contained in the film by the above method for the above-described polyethylene terephthalate film having a thickness of 40 µm used in the production of each conductive substrate, the content of the specific compound was equal to or smaller than the detection limit.

HPLC Measurement Conditions

Column: Octadecyl silyl (ODS) column (4.6 mm×50 mm) ("InertSustain AQ-C18" manufactured by GL Sciences Inc.)

Eluent: Aqueous solution of 0.1% phosphoric acid/acetonitrile of 0.1% phosphoric acid (mixing ratio: 50/50)

Flow rate: 0.7 ml/min

Detector: Photodiode array

Sample injection volume: 10 µL

Sulfurization Resistance

The sulfurization resistance of each of the conductive substrates produced in Examples and Comparative Examples was evaluated by the following method.

The resistance value (R0) of the produced sample having a mesh-type pattern shape was measured. An Agilent 34405A multimeter device was used for the measurement, and the electrical resistance (unit: kΩ) between the terminals at a distance of 4 cm was measured for each sample.

Next, vulcanized ethylene propylene diene rubber (EPDM) "E-4408" (manufactured by INOAC CORPORATION) was cut into a size of a length of 3.5 cm, a width of 3 mm, and a thickness of 1 mm, and the EPDM section was fixed to the sample so that it was in contact with the surface of the sample on the conductive layer side. After allowing the sample on which the section had been fixed to stand at 80° C. for 5 days, the section was removed from the sample, and the resistance value (R1) of the sample was measured by the above method.

From the measured resistance value, the rate of change in resistance was calculated according to the following expression.

Rate of change in resistance=$(R1/R0-1)\times 100[\%]$

From the calculated rate of change in resistance, the sulfurization resistance of each sample was evaluated according to the following standards. In a case where the evaluation of the sulfurization resistance is A or B, it is conceived that there is no practical problem.

Sulfurization Resistance Evaluation Standard

"A": The rate of change in resistance is 30% or less.

"B": The rate of change in resistance is more than 30% and 50% or less.

"C": The rate of change in resistance is more than 50%.

Tint Change Δb*

The tint change Δb* of each conductive substrate produced in Examples and Comparative Examples was evaluated by the following method.

The produced sample was cut into 3 cm 3 cm, and the b* value (b*0) of the surface of the cut sample on the conductive layer side was measured by using a reflection densitometer ("SpectroEye (registered trade name) LT" manufactured by Gretag Macbeth). It is noted that the b* value is one of the indexes in the L*a*b color system, and the larger the b* value is in the positive direction, the stronger the yellow tint is.

Next, the cut sample was allowed to stand for 10 days in an environment of a temperature of 60° C., and a humidity of 90 RH %. The sample subjected to the storage test was returned to room temperature, and the b* value (b*1) of the surface of the sample on the conductive laver side was measured again by using a reflection densitometer.

The amount of change in the b* value (Δb*) before and after the storage test was calculated by using the following expression.

$\Delta b^* = b^*1 - b^*0$

As Δb* becomes closer to 0, the tint change of the conductive substrate becomes smaller temporally, and thus the problem tends to hardly occur in actual use.

Table 1 below shows whether or not the plating treatment (the step E1) is carried out in the production of the conductive substrate and shows the kind and content of the specific compound contained in the conductive substrate, as well as the evaluation results of sulfurization resistance and tint change Δb*.

In the table, in the column of "Name" of "Solvent", "DEGMBE", "PGMPE", "EGMPE", and "EGMBE" respectively mean diethylene glycol monobutyl ether, propylene glycol monopropyl ether, ethylene glycol monopropyl ether, and ethylene glycol monobutyl ether.

TABLE 1

| | | Specific compound | | | Another sulfur compound | Solvent | | Evaluation | |
|---|---|---|---|---|---|---|---|---|---|
| | Plating Treatment | Kind | Ratio | Content [µg/cm$^2$] | (Content [µg/cm$^2$]) | Name | Ratio | Sulfurization resistance | Tint change Δb* |
| Example 1 | No | 2-mercaptobenzimidazole | — | 0.6 | — | Water/ethanol | 50/50 | A | 0.2 |
| Example 2 | No | 5-methyl-2-mercaptobenzimidazole | — | 0.8 | — | Water/ethanol | 50/50 | A | 0.1 |

TABLE 1-continued

| | Plating Treatment | Specific compound Kind | Ratio | Content [μg/cm²] | Another sulfur compound (Content [μg/cm²]) | Solvent Name | Ratio | Evaluation Sulfurization resistance | Tint change Δb* |
|---|---|---|---|---|---|---|---|---|---|
| Example 3 | No | 5-methoxy-2-mercaptobenzimidazole | — | 0.5 | — | Water/ethanol | 50/50 | A | 0.2 |
| Example 4 | No | 5-chloro-2-mercaptobenzimidazole | — | 1.7 | — | Water/ethanol | 50/50 | A | 0.4 |
| Example 5 | No | 5-nitro-2-mercaptobenzimidazole | — | 0.7 | — | Water/ethanol | 50/50 | B | 0.2 |
| Example 6 | No | 5-methyl-2-mercaptobenzimidazole | — | 2.3 | — | Water/ethanol | 50/50 | A | 0.5 |
| Example 7 | No | 5-methyl-2-mercaptobenzimidazole | — | 4.1 | — | Water/ethanol | 50/50 | A | 0.8 |
| Example 8 | No | 5-methyl-2-mercaptobenzimidazole | — | 7.8 | — | Water/ethanol | 50/50 | A | 1.5 |
| Example 9 | No | 5-methyl-2-mercaptobenzimidazole | — | 11.8 | — | Water/ethanol | 50/50 | A | 4.0 |
| Example 10 | No | 5-methyl-2-mercaptobenzimidazole | — | 0.3 | — | Water/ethanol | 50/50 | A | 0.2 |
| Example 11 | No | 5-methyl-2-mercaptobenzimidazole | — | 0.08 | — | Water/ethanol | 50/50 | B | 0.0 |

TABLE 2

| (Continued) | Plating treatment | Specific compound Kind | | Ratio | Content [μg/cm²] | Another sulfur compound (Content [μg/cm²]) | Solvent Name | Ratio | Evaluation Sulfurization resistance | Tint change Δb* |
|---|---|---|---|---|---|---|---|---|---|---|
| Example 12 | No | 2-mercapto-benzimidazole | 5-methyl-2-mercapto-benzimidazole | 90/10 | 0.8 | — | Water/ethanol | 85/15 | A | 0.2 |
| Example 13 | No | 2-mercapto-benzimidazole | 5-mercapto-5-benzimidazole sodium sulfate | 85/15 | 0.7 | — | Water/ethanol | 85/15 | A | 0.3 |
| Example 14 | No | 2-mercapto-benzimidazole | — | — | 0.7 | 2-mercapto-benzoxazole (0.12) | Water/ethanol | 85/15 | A | 0.2 |
| Example 15 | No | 2-mercapto-benzimidazole | — | — | 1.2 | — | Water/ethanol/DEGMBE | 85/7.5/7.5 | A | 0.2 |
| Example 16 | No | 2-mercapto-benzimidazole | — | — | 1.4 | — | Water/ethanol/PGMPE | 85/7.5/7.5 | A | 0.4 |
| Example 17 | No | 2-mercapto-benzimidazole | — | — | 0.9 | — | Water/ethanol/EGMPE | 85/7.5/7.5 | A | 0.2 |
| Example 18 | No | 2-mercapto-benzimidazole | — | — | 1.0 | — | Water/ethanol/EGMBE | 85/7.5/7.5 | A | 0.2 |
| Example 19 | Yes | 5-methyl-2-mercapto-benzimidazole | — | — | 0.5 | — | Water/ethanol | 50/50 | A | 0.2 |
| Example 20 | Yes | 5-methoxy-2-mercapto-benzimidazole | — | — | 0.7 | — | Water/ethanol | 50/50 | A | 0.2 |
| Example 21 | Yes | 5-chloro-2-mercapto-benzimidazole | — | — | 1.2 | — | Water/ethanol | 50/50 | A | 0.3 |
| Comparative Example 1 | No | — | — | — | — | — | — | — | C | 0.0 |
| Comparative Example 2 | Yes | — | — | — | — | — | — | — | C | 0.1 |

As shown in Table 1, it has been confirmed that according to the conductive substrate according to the embodiment of the present invention, the desired effect can be obtained.

Further, from the comparison of Examples 1 to 3 and 5 having the similar content, it has been confirmed that in a case where the specific compound is 2-mercaptobenzimidazole, 5-methyl-2-mercaptobenzimidazole, or 5-methoxy-2-mercaptobenzimidazole, the effect of the present invention is more excellent.

Further, it has been confirmed that in a case where the content of the specific compound is 0.1 to 10 μg/cm² per area of the conductive layer, the effect of the present invention and the effect of suppressing the tint change Δb* are excellent in a well-balanced manner.

EXPLANATION OF REFERENCES

10: conductive substrate
12: base material
14: conductive layer
16: conductive thin wire part
18: transparent insulating part
20: non-thin wire part

What is claimed is:

1. A conductive substrate comprising:
a base material; and
a conductive layer arranged on the base material,
wherein the conductive layer has a conductive thin wire part containing a metal and a transparent insulating part containing no metal, the transparent insulating part being adjacent to the conductive thin wire part, and
the conductive layer contains a compound represented by Formula (1),

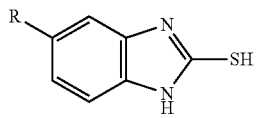

(1)

in Formula (1), R represents a hydrogen atom, an alkyl group having 1 to 4 carbon atoms, an alkoxy group having 1 to 4 carbon atoms, a halogen atom, an amino group, a nitro group, or a sulfo group or a salt thereof.

2. The conductive substrate according to claim 1,
wherein R represents a hydrogen atom, an alkyl group having 1 to 3 carbon atoms, or an alkoxy group having 1 to 3 carbon atoms.

3. The conductive substrate according to claim 1,
wherein the compound includes at least one selected from the group consisting of 2-mercaptobenzimidazole, 5-methyl-2-mercaptobenzimidazole, and 5-methoxy-2-mercaptobenzimidazole.

4. The conductive substrate according to claim 1,
wherein a content of the compound per area of the conductive layer is 0.1 to 10 μg/cm².

5. The conductive substrate according to claim 1,
wherein the metal includes silver.

6. The conductive substrate according to claim 1,
wherein the conductive substrate has a mesh pattern formed from the conductive thin wire.

7. A touch panel comprising the conductive substrate according to claim 1.

* * * * *